United States Patent [19]

Narramore

[11] Patent Number: 5,094,412
[45] Date of Patent: Mar. 10, 1992

[54] FLAPERON SYSTEM FOR TILT ROTOR WINGS

[75] Inventor: Jimmy C. Narramore, Bedford, Tex.

[73] Assignee: Bell Helicopter Textron Inc., Fort Worth, Tex.

[21] Appl. No.: 417,811

[22] Filed: Oct. 13, 1989

[51] Int. Cl.⁵ .................................... B64C 9/02
[52] U.S. Cl. ............................ 244/214; 244/130; 244/219
[58] Field of Search ............... 244/214, 215, 216, 213, 244/130, 219

[56] References Cited

U.S. PATENT DOCUMENTS

| | | | |
|---|---|---|---|
| 1,785,620 | 12/1930 | Frise | 244/216 |
| 2,407,401 | 9/1946 | Clauser et al. | 244/216 |
| 2,772,058 | 11/1956 | Grant | 244/42 |
| 2,908,454 | 10/1959 | De Wolff | 244/42 |
| 2,920,844 | 1/1960 | Marshall | 244/42 |
| 2,928,626 | 3/1960 | Tino . | |
| 3,092,354 | 6/1963 | Alvarez-Calderon . | |
| 3,112,089 | 11/1963 | Dornier | 244/42 |
| 3,121,544 | 2/1964 | Alvarez-Calderon . | |
| 3,126,173 | 3/1964 | Alvarez-Calderon | 244/42 |
| 3,129,907 | 4/1964 | Dornier | 244/42 |
| 3,145,950 | 8/1964 | Circais | 244/216 |
| 3,167,273 | 1/1965 | Alvarez-Calderon | 244/12 |
| 3,179,354 | 4/1965 | Alvarez-Calderon . | |
| 3,195,836 | 7/1965 | Alvarez-Calderon | 244/42 |
| 3,203,647 | 8/1965 | Alvarez-Calderon | 244/42 |
| 3,223,356 | 12/1965 | Alvarez-Calderon | 244/13 |
| 3,371,888 | 3/1968 | Alvarez-Calderon | 244/42 |
| 3,430,894 | 3/1969 | Strand | 244/7 |
| 3,481,561 | 12/1969 | Alvarez-Calderon | 244/42 |
| 3,524,610 | 8/1970 | Avlarez-Calderon | 244/42 |
| 3,874,617 | 4/1975 | Johnson | 244/42 |
| 3,917,192 | 11/1975 | Alvarez-Calderon | 244/42 |
| 3,977,630 | 8/1976 | Lewis | 244/43 |
| 4,149,688 | 4/1979 | Miller | 244/12.4 |
| 4,248,395 | 3/1981 | Cole | 244/216 |
| 4,360,176 | 11/1982 | Brown | 244/215 |
| 4,471,927 | 9/1984 | Rudolph et al. | 244/216 |
| 4,498,646 | 2/1985 | Proksch | 244/35 |
| 4,566,657 | 1/1986 | Grow | 244/90 |
| 4,605,187 | 8/1986 | Stephenson | 244/216 |

FOREIGN PATENT DOCUMENTS 1943680  6/1982  Fed. Rep. of Germany ...... 244/215

*Primary Examiner*—Galen Barefoot
*Attorney, Agent, or Firm*—Richards, Medlock & Andrews

[57] ABSTRACT

The present invention provides an aircraft wing (10) having a main portion (20) with a trailing edge (20b) and a movable flaperon (22) hingedly secured at the trailing edge. A movable flaperon seal (40) is hingedly attached at its leading edge to the trailing edge of the main portion of the wing. Interconnecting structure is provided between the main portion of the wing and the flaperon seal. Such structure is operable to pivot the seal flap such that the opening between the trailing edge of the main wing portion (20b) and the leading edge of said movable flap (22a) on the upper surface is selectively closed by the movable flap at predetermined angular positions of the movable flap.

14 Claims, 4 Drawing Sheets

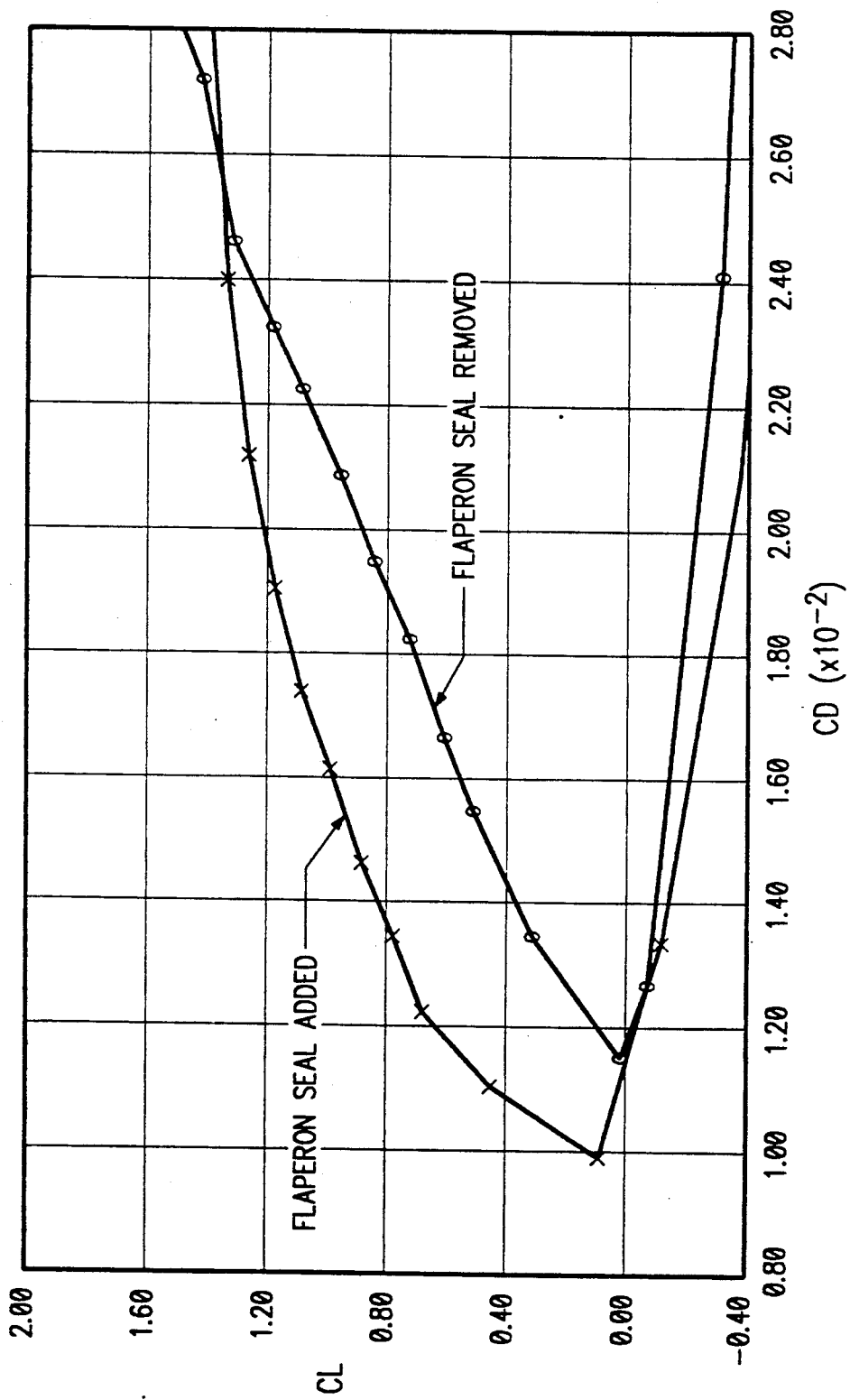

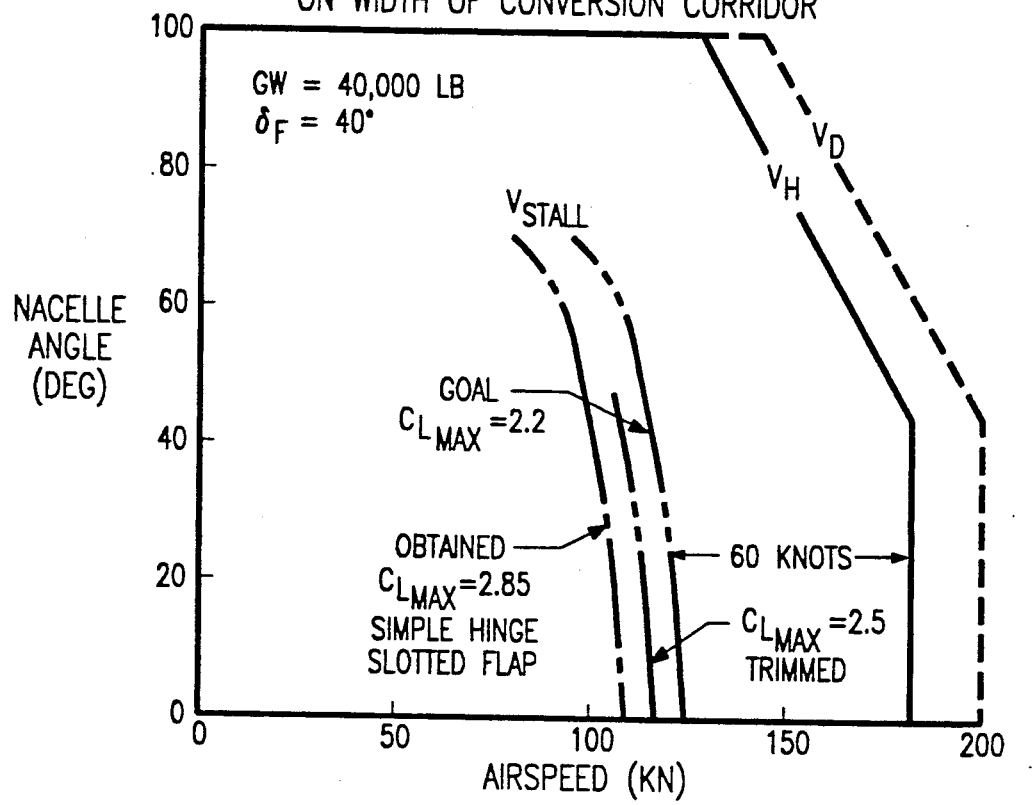
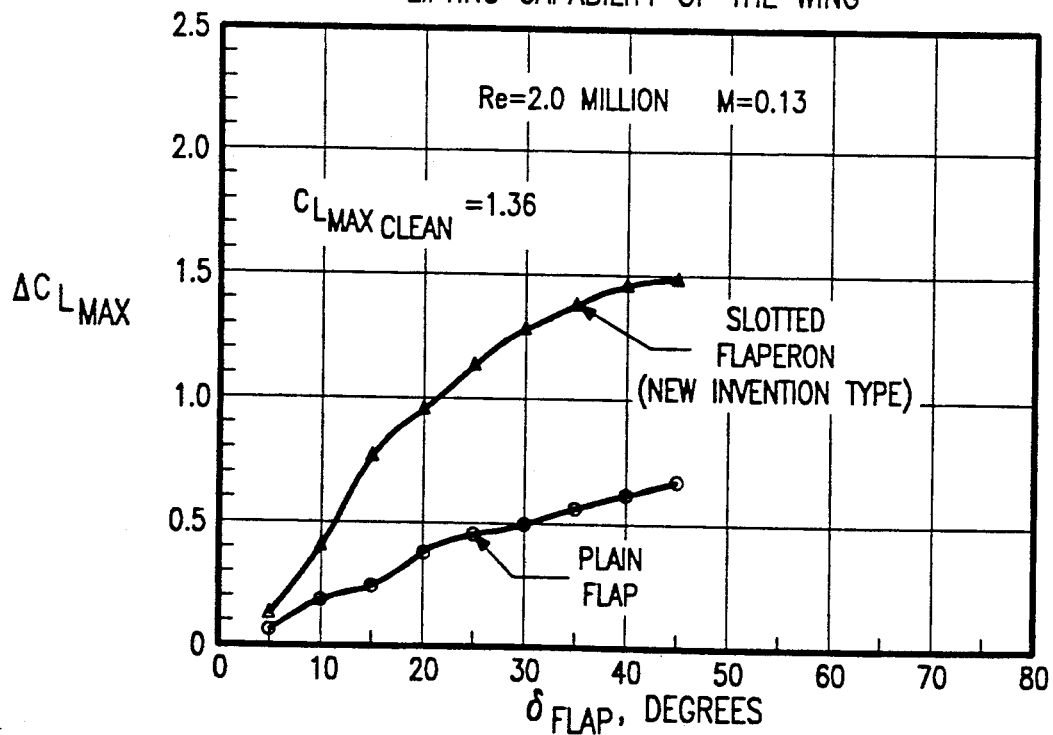

FLAPERON SYSTEM FOR TILT ROTOR WINGS

This invention was made with Government support under N00019-83-C-0166 awarded by Department of the Navy, Naval Air Systems Command. The Government has certain rights in this invention.

TECHNICAL FIELD

This invention relates to a flaperon system which functions as the flap and aileron on an aircraft wing. The flaperon system incorporates a position controlled seal which is controlled to selectively close the gap between the trailing edge of the aircraft wing and the leading edge of the flaperon to improve aircraft performance.

BACKGROUND OF THE INVENTION

Tilt rotor aircraft represent an innovative step in the evolution of aircraft design. The tilt rotor design allows an aircraft to assume the vertical take-off and landing characteristics of a helicopter. Once in flight, the rotors can rotate forward, allowing the aircraft to fly like a fixed wing aircraft. To minimize the weight of the vehicle a shorter stiffer wing is used. This leaves little space for effective control surfaces.

A typical wing design for an aircraft includes a primary wing surface incorporating ailerons and flaps. The flaps are designed to increase wing lift while the ailerons are used for roll axis control. The flaps on each wing operate in unison to increase wing lift by increasing the camber of the wing. By comparison, ailerons are pivoted oppositely to increase lift on one wing while reducing lift on the opposite wing to induce a rolling moment.

Due to the marginal space available on the wing area of tilt rotor aircraft, in some designs the flaps and ailerons have been combined into a single unit known as the flaperon. In most designs at least one flaperon unit is located on each wing of the aircraft. On take-offs or landings, the flaperons work in conjunction to provide additional wing lift. To induce aircraft roll, the flaperons are pivoted in opposite directions to effect such a manuever.

Aerodynamic lift of a tilt rotor wing is dependent on, among other things, the deflection of the flaperon, the size of the wing, the flight speed of the vehicle, and the state of the air that is flowing over the surface of the wing. To effectively produce lift, the air must flow smoothly over the wing without producing flow separation and the associated large regions of dead air. Large regions of flow separation are associated with stall of the wing and small regions of flow separation increase drag. At low speed flight conditions, downward rotations of the flaperon are required to minimize flow separation and generate the necessary lift force. As the speed of the vehicle is increased, the lift force is increased due to increased dynamic pressure and less flap downward rotation is needed to generate the required lift force.

At these high-speed airplane cruise conditions, large amounts of drag force will be generated, due to flow separation, if the gap between the trailing edge of the wing and the flaperon remains open. Since the flaperon must also rotate upward in the high speed forward condition to provide roll control, flow characteristics over this gap can be improved by a device which will bridge the gap and provide a continuous flow surface.

Several devices have been built to augment the lift capability of different types of flight vehicles. For example, U.S. Pat. No. 3,977,630 to Lewis et al., discloses a wing design for a Short Take-off and Landing (STOL) aircraft. The design incorporates a multi-segmented externally-blown flap that uses jet exhaust to augment the lift, and more notably slot closing devices. When the flap pieces extend from each other, slot closing devices, which are controlled independently of the position of the flaps, bridge the spanwise slots or coves formed by the extended flaps.

U.S. Pat. No. 3,112,089 to Dornier discloses a segmented flap. The segments are shaped such that when the flap is lowered the segments rotate to produce a substantially continuous top surface. This design fails to provide a separate gap control device.

U.S. Pat. No. 2,772,058 to Grant discloses a slot controller. This slot controller helps fill the gap between the trailing edge of the wing and the primary flap assembly at only certain flap orientations. As the flaps are rotated upwardly, they act as spoilers and a gap is opened between the flap and wing section.

U.S. Pat. No. 3,223,356 to Alverez-Calderon discloses a wing flap system for a Vertical Take-off and Landing (VTOL) aircraft that includes a rotating cylinder and a cover plate for providing a low drag surface between the upper surface of the wing and associated flap. The flap system has movable portions including inboard and outboard regions. These regions are deflected at a fixed negative flap setting for cruise. However, the flaps cannot move during cruise.

U.S. Pat. No. 2,908,454 to DeWolff is to one aircraft wing having multiple flaps driven by a track linkage for controlling the downward motion of the flaps. The system does not provide for a flaperon combination with structure for controlling the gap between the flaperon and wing at all flaperon orientations.

A need exists for a device that will function as both the flaps and the ailerons with an appropriate seal for bridging and thereby selectively sealing the gap between the primary wing surface and the flaperon at appropriate flaperon orientations. Such a seal should provide an uninterrupted upper boundary wing surface to eliminate drag due to flow moving from the lower surface to the upper surface. Additionally, a system is needed for controlling the angular orientation of this flaperon seal so that it is easily, and automatically positioned properly for all angles of adjustment relative to the wing segment.

SUMMARY OF THE INVENTION

This invention relates to a novel flaperon system that provides improved performance to tilt rotor aircraft. In one embodiment of the invention, the flaperon system is incorporated in an aircraft wing having a main wing portion with a defined trailing edge thereon. A pivotal flaperon cooperates with the wing and has a leading edge hingedly secured relative to the trailing edge of the main wing portion. A flaperon seal is provided between the main wing portion and the flaperon and is controlled by an interconnecting structure between the main wing portion and the flaperon. The interconnecting structure is designed such that as the flaperon is pivoted, the gap between the trailing edge of the main portion of the wing and the leading edge of the movable flaperon on the upper surface is selectively filled by the movable flaperon seal at selected position angles for the flaperon.

In a further embodiment of the invention, the interconnecting structure comprises an arm extending from the flaperon seal with a cam follower attached thereto. A cam surface is provided on the flaperon for guiding the flaperon to effect the desired angular orientation of the flaperon seal. In one embodiment of the invention, the cam surface is a track for receiving the cam follower therein.

As a result of the present design, the flaperon system automatically positions the flaperon seal at a desired angular position as the flaperon is pivoted about its hinge line at the trailing edge of the main wing section. By designing the interconnection between the flaperon seal and the flaperon, and specifically designing the cam surface, the position of the flaperon seal can be controlled for any position of the flaperon. Through wind tunnel and other testing, the optimum flaperon and flaperon seal configurations can be determined to maximize the performance of the tilt rotor wing. Such configuration can be chosen to provide maximum aerodynamic performance to weight ratio characteristics.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 4 illustrates the drag-reduction resulting from the flaperon system of the present invention;

FIG. 5 illustrates the effect of the maximized lift coefficient on the width of the conversion corridor of a tilt-rotor vehicle; and FIG. 6 illustrates improvement in the maximum lift coefficient created by the flaperon seal.

DETAILED DESCRIPTION OF THE DRAWINGS

Figures 1, 2:
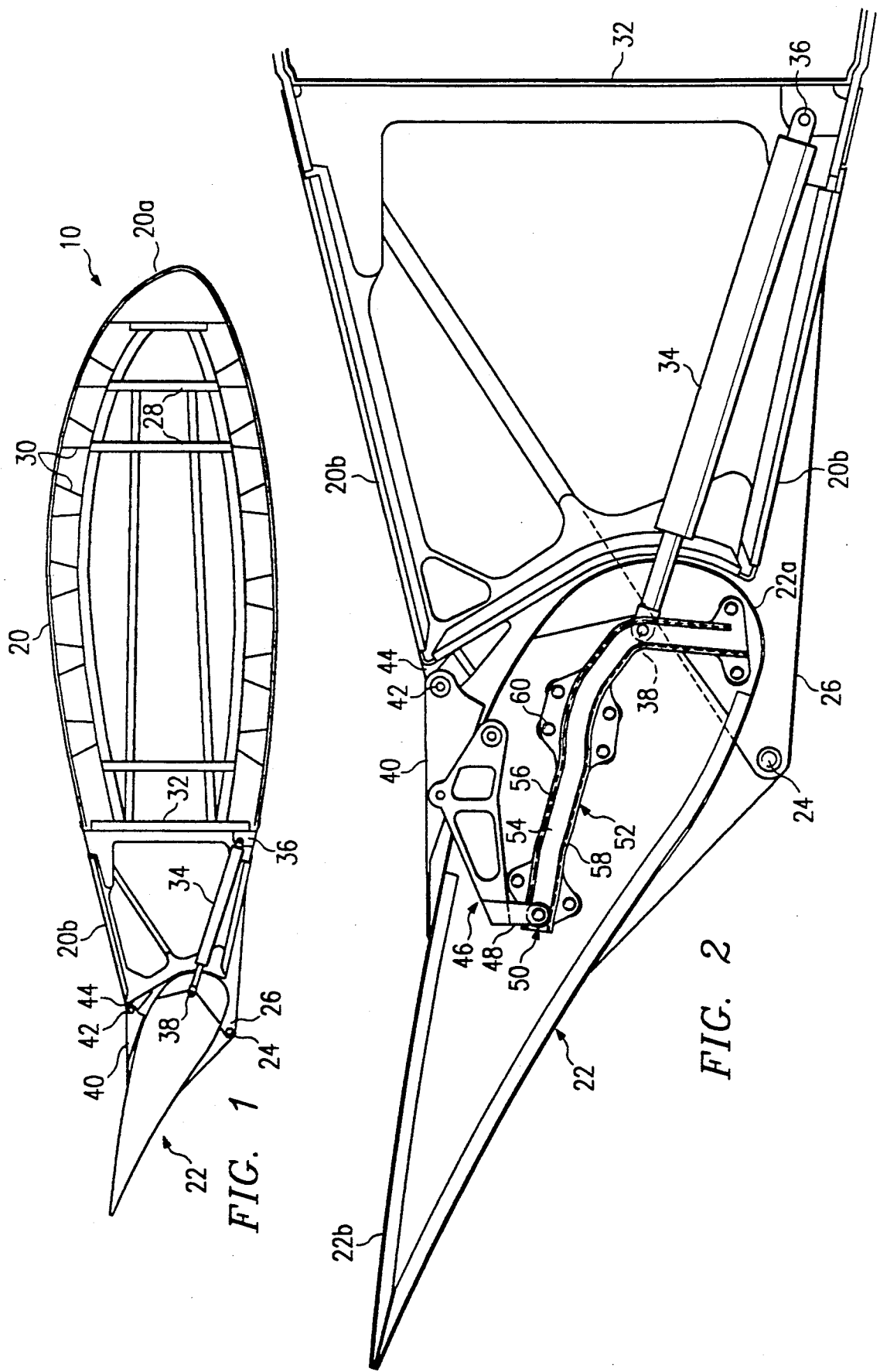
FIG. 1 is a sectional view of an aircraft wing incorporating the flaperon system of the present invention.
FIG. 2 is a more detailed view of the aircraft wing of FIG. 1 showing the trailing edge of the aircraft wing, flaperon, flaperon seal, and actuator.

The present invention is an aircraft wing flaperon system that overcomes many of the disadvantages found in the prior art. Referring to FIG. 1, an aircraft wing 10 embodying the present invention is disclosed. Wing 10 comprises a main wing portion 20, a flaperon 22, and a flaperon seal 40.

The main wing portion 20 comprises a leading edge 20a and a trailing edge 20b. The main wing portion 20 has conventional internal structure including stiffeners 28 and stringers 30. A rear spar 32 also forms an integral part of main wing portion 20. An actuator 34 is pivotally attached to rear spar 32 at point 36. The actuator, designed to telescopically extend toward the trailing edge 20b of main wing portion 20, pivotally connects to flaperon 22 at connection point 38.

Flaperon 22 is hingedly connected at hinge axis 24 by means of a fitting 26 which extends rearwardly below main wing portion 20. The flaperon has a leading edge 22a and a trailing edge 22b. Actuator 34 attaches to flaperon 22 at point 38, off-axis to hinge point 24. Therefore, when the actuator telescopes toward the flaperon, the flaperon moves away from the trailing edge 20b of the main wing portion, and rotates about hinge axis 24.

Flaperon seal 40 includes a contoured plate of sufficient span and length which is pivotally attached to its forward end about a hinge line 42. This attachment is made to a fitting 44 which extends from the trailing edge 20b of the main wing section 20.

FIG. 2 discloses flaperon seal 40 in more detail. The seal includes an arm 46 which is rigidly attached thereto and includes an extension 48 with a cam follower 50 attached at its distal end. The cam follower 50 moves within a cam tract 52 which is attached to flaperon 22. In one embodiment, track 52 includes a channel having a base 54 with upstanding legs 56, 58 in which the roller moves during the operation of the system.

Cam surface 52 is rigidly attached to the ends of flaperon 22 by a multitude of fasteners 60. As the flaperon rotates the cam surface 52 also rotates, and cam follower 50 translates along the fixed path defined by cam surface 52.

Figure 3A:
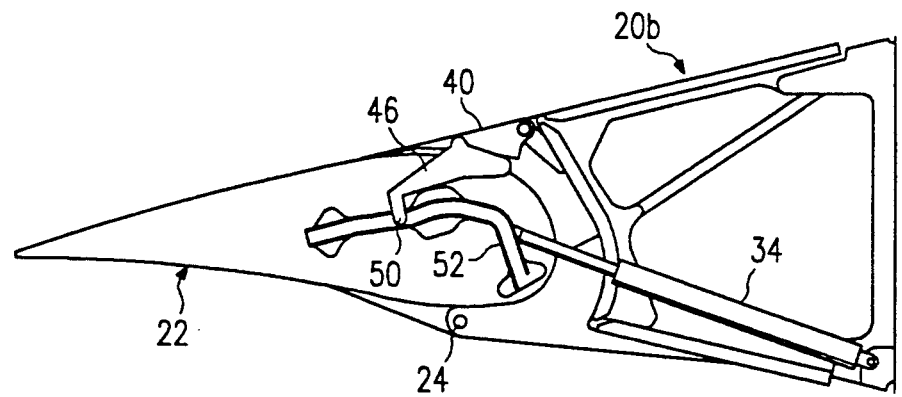
FIG. 3a depicts the flaperon in a neutral, horizontal position.
Figure 3B:
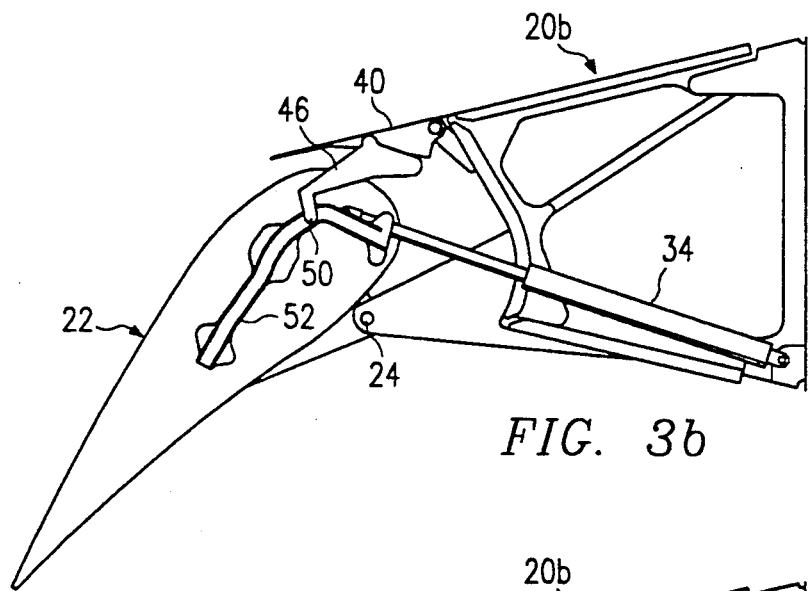
FIG. 3b depicts the flaperon in a partially lowered position.
Figure 3C:
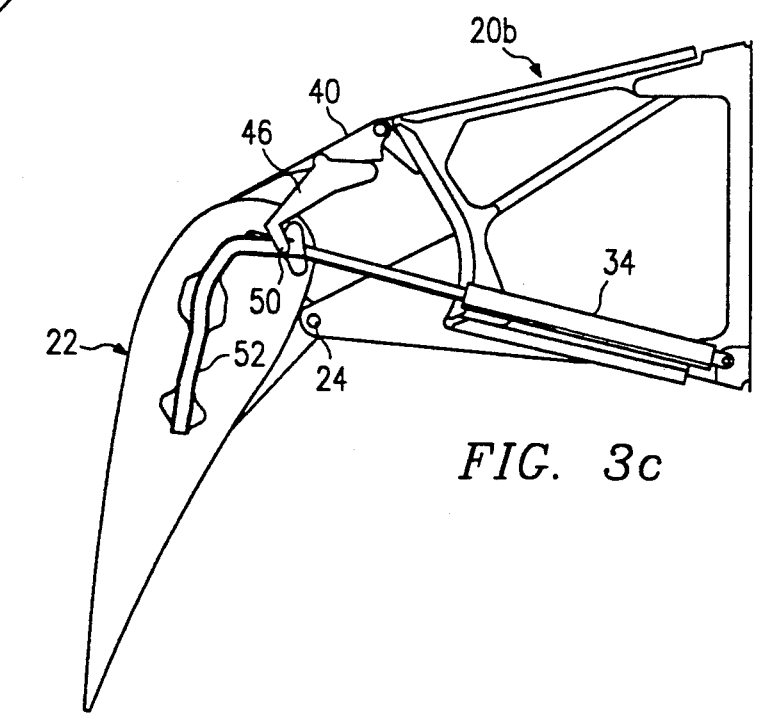
FIG. 3c depicts the flaperon positioned at its lower most deflection.

FIGS. 2, 3a, 3b, and 3c show the flaperon at various angles of deflection. As shown in FIG. 2, when the flaperon trailing edge 22b is elevated to 25° (the limit of its upstroke) the flaperon cove is completely sealed by the flaperon seal. FIG. 3a shows the flaperon 22 at a neutral, horizontal position. In this position, which is the position corresponding to high speed flight, dynamic pressure over the wing is high and the flap seal is positioned to close the gap between the seal and main wing portion. FIG. 3b shows the flaperon with its trailing edge down by more than 5°, representing the flaperon in the "flap" position. As can be seen, a slight gap exists between flaperon 22 and the flaperon seal 40 at this setting. Such a gap opening has been found necessary to maintain flow attachment to the upper wing surface, thereby avoiding a stall condition. In FIG. 3c, the flaperon trailing edge 22b is at its maximum downward deflection of 67°. Due to the shape of cam surface 52, no gap is provided between the flaperon 22 and flaperon seal 40.

As can be seen, the system of the present invention, allows the wing designer to select any position of the flaperon seal for any deflection of the flaperon by design of the track 52, the cooperating arm 46, and follower 50. By design of this structure, the flaperon seal can be automatically positioned in response to the movement of the flaperon to either a closed or partially closed position as is dictated by aerodynamic needs.

FIG. 4 illustrates the drag reducing effect of the flaperon seal on the drag of a tilt-rotor airfoil. With the flaperon seal added, the drag coefficient (CD) of the sample wing section is 26.8% lower than with the flaperon seal removed at a cruise lift coefficient (CL) of 0.4. This translates into 10 knots of maximum speed improvement at sea level and an increase of payload or fuel by 388 lbs. At flaperon trailing edge down positions between 5° and 45°, the flaperon seal remains in the 5° position. This is required to provide the high maximum lift increments needed to provide maneuverability in a large conversion corridor for the tilt rotor. Data was recorded at Mach=0.13 and a Reynold's Number=2.00 million.

FIG. 5 shows the effect of a maximized lift coefficient on the width of the conversion corridor for a tilt rotor vehicle. As indicated, an increase in the maximum lift capability of the vehicle increases the allowable speed range for the conversion from helicopter mode to airplane mode.

The maximized lift coefficient is significantly improved by the use of the new flaperon system as it is illustrated in FIG. 6. The data illustrated thereon shows that the maximum lift increment due to controlled surface deflection is increased by 122% over a plain type flap system. In addition, high wing lift to drag ratios result from using the new flaperon system. At flaperon angles greater than 45° trailing edge down, the gap between the flaperon seal and the flaperon are reduced and at the end of the stroke (67° down) the gap or cove approaches zero to reduce the download in helicopter mode.

In summary, the present structure provides a wing structure and flaperon system. The flaperon system defines the motion of the flaperon, flaperon seal, and resulting gap during up and down motion of the flaperon thus maximizing the performance of the tilt rotor aircraft. In the preferred embodiment, cam tract is mounted on each end of the flaperon. The flaperon seal responds to this cam track by means of a bracket and cam follower. The cam follower, which rides within the cam tract, is rotatably mounted on the bracket which is attached to the flaperon seal. When the flaperon rotates, the attached cam track likewise rotates, and the cam follower moves with the cam track. This motion in turn transfers to the flaperon seal via the bracket. The flaperon is moved by a flaperon actuator mounted against the spar of the primary wing assembly. The flaperon rotates about a fixed hinge point. Typically, each flaperon attaches to the primary wing assembly with four hinges.

By way of the present invention, a reliable yet relatively simple structure is provided for automatically setting the flaperon seal in response to the position of the flaperon. The position of the flaperon seal for any setting of the flaperon can be readily designed to maximize wing performance and reduce drag by simply altering the design of the connecting structure and the cam track which is part thereof.

Although preferred embodiments of the invention have been described in the foregoing Detailed Description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit and scope of the invention.

I claim:

1. An aircraft wing assembly comprising:
   (a) a main wing portion having a trailing edge;
   (b) a pivotal flaperon directly attached to said main wing portion;
   (c) a flaperon seal pivotally attached to said main wing portion;
   (d) control means for interconnecting said flaperon and said flaperon seal and for angularly positioning said flaperon seal relative to said flaperon as said flaperon is pivoted relative to said main wing portion, said control means comprising:
      (i) a rigid arm attached to said flaperon seal;
      (ii) a cam follower attached to said rigid arm;
      (iii) a cam surface for receiving said cam follower attached to said flaperon; and
   (e) actuation means for moving said flaperon relative to said main wing portion.

2. The wing of claim 1 wherein said main wing portion comprises:
   an airfoil having a leading edge and a trailing edge.

3. The wing of claim 1 wherein said pivotal flaperon comprises:
   an airfoil having a leading edge and a trailing edge, the leading edge hingedly secured relative to the trailing edge of said main wing portion.

4. The wing of claim 1 wherein said flaperon seal comprises:
   a plate dimensioned to span the gap between the trailing edge of said main wing portion and the leading edge of said flaperon.

5. The wing of claim 1 wherein said flaperon seal further comprises:
   a plate hingedly secured about a single pivot point to the trailing edge of said main wing portion.

6. The wing of claim 1 wherein said rigid arm comprises:
   a fitting which connects the flaperon seal to the cam follower.

7. The wing of claim 1 wherein said cam follower comprises:
   a roller dimensioned to fit within a track defined by the cam surface and rotatably connected to the rigid arm.

8. The wing of claim 1 wherein said cam surface comprises:
   a channel defined by upstanding legs along its length to define a path, and said channel being rigidly connected to said flaperon at spaced points along the span of the main wing portion.

9. The wing of claim 1 wherein said actuation means comprises:
   a hydraulic actuator connected between said flaperon with said main wing portion.

10. The wing of claim 1 wherein said actuation means comprises:
    a hydraulical actuator rigidly mounted between said main wing portion and flaperon with its line of extension being off axis of said hinge point of said flaperon to the main portion such that extension of said actuator causes the flaperon to rotate about said hinge point.

11. An aircraft wing comprising:
    (a) a main wing portion having a trailing edge,
    (b) a pivotal flaperon having a leading edge hingedly secured directly to the trailing edge of said main wing portion,
    (c) a flaperon seal pivotally attached to said main wing portion; and
    (d) control means interconnecting said flaperon and flaperon seal for pivoting said flaperon seal such that the gap between the trailing edge of said main portion and the leading edge of said movable flaperon on the upper surface is selectively closed by said movable flaperon seal at predetermined position angles for said movable flaperon, said control means comprising:
       (i) an arm extending from said flaperon seal with a cam follower attached thereto; and
       (ii) a cam surface on said movable flaperon portion for guiding said cam follower to effect the desired angular orientation of said flaperon seal.

12. The aircraft wing of claim 11 wherein said cam surface is a track for receiving the cam follower.

13. In an aircraft wing having a main portion with a trailing edge and a movable flaperon hingedly secured at the trailing edge, a seal comprising:
   (a) a movable flaperon seal having a leading edge hinged for movement relative to the trailing edge of the main portion of the wing.
   (b) interconnecting structure comprising an arm extending from said flaperon seal with a cam follower attached thereto, and a cam surface on said movable flaperon for following said cam follower to effect the positioning of said flap seal, such structure being operable to pivot said seal flap such that the gap between the trailing edge of the main portion and the leading edge of said movable flap on the upper surface is selectively closed by said movable flap at predetermined angular positions for said movable flap.

14. The seal of claim 13 wherein the cam surface is a channel track for receiving the cam follower.

* * * * *